A. L. REDRUP & H. K. BOYLE.
INTERNAL COMBUSTION ENGINE.
APPLICATION FILED DEC. 20, 1913.

1,109,644.

Patented Sept. 1, 1914.
2 SHEETS—SHEET 1.

WITNESSES
Geo. D. Riley.
C. A. Krey.

INVENTORS:
Alfred Leason Redrup
BY Henry Kirk Boyle,
ATTORNEYS.

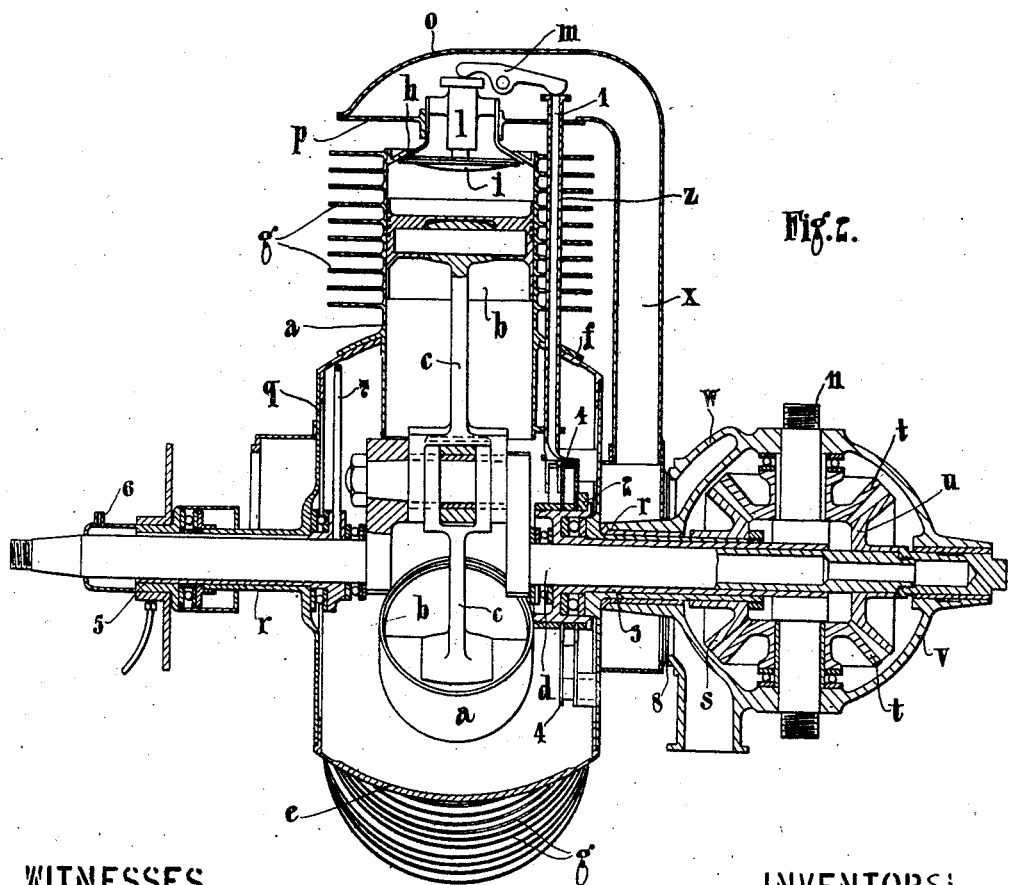

UNITED STATES PATENT OFFICE.

ALFRED LEASON REDRUP AND HENRY KIRK BOYLE, OF LEEDS, ENGLAND.

INTERNAL-COMBUSTION ENGINE.

1,109,644.  Specification of Letters Patent.  Patented Sept. 1, 1914.

Application filed December 20, 1913. Serial No. 807,947.

*To all whom it may concern:*

Be it known that we, ALFRED LEASON REDRUP, and HENRY KIRK BOYLE, subjects of the King of Great Britain and Ireland, and both residing at Asket Hill, Roundhay, Leeds, in the county of York, England, have invented certain new and useful Improvements in Internal-Combustion Engines, of which the following is a specification.

This invention relates to internal combustion engines of the rotary type and has for its object to produce a cheap and efficient engine by devising improvements in the construction and arrangement of the same with particular reference to the exhausting, silencing and lubricating arrangements that are employed and the construction and arrangement of cylinders and gearing.

The accompanying drawings illustrate one mode of carrying out the invention.

Figure 1:
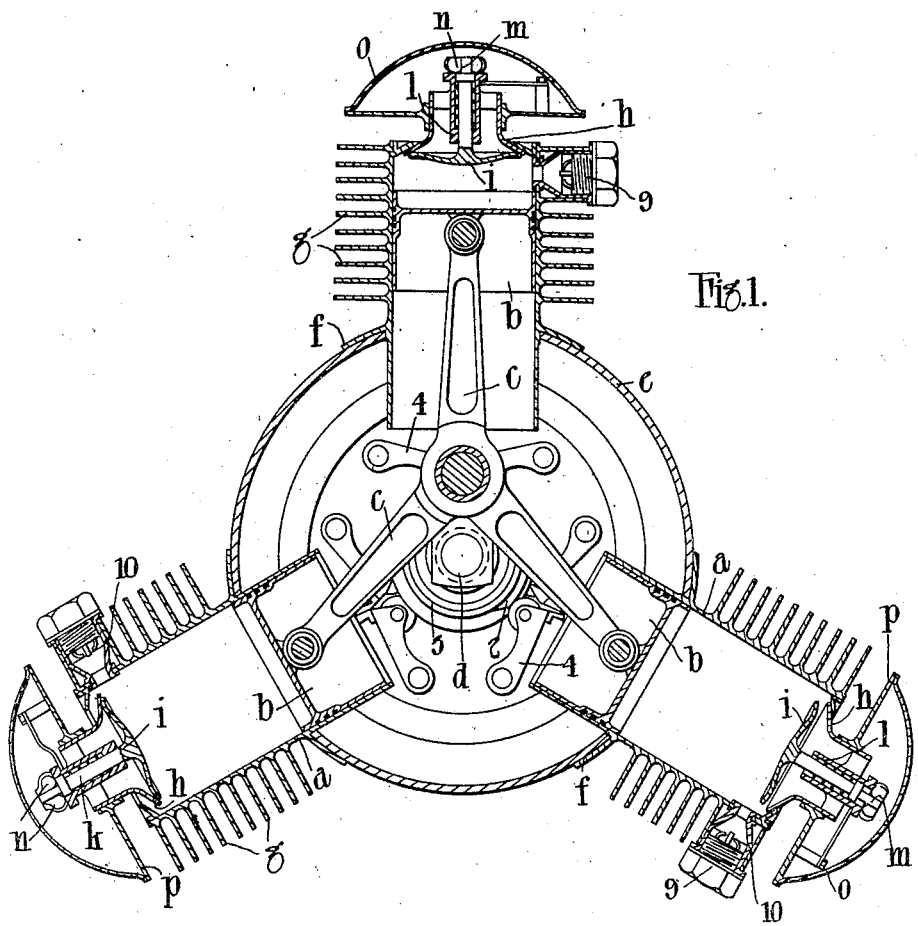
Figure 3:
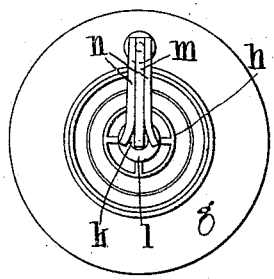

Figure 1 is a transverse sectional elevation illustrating one convenient form of engine constructed and arranged in accordance with the invention; Fig. 2 is a longitudinal sectional elevation, while Figs. 3 and 4 are views illustrating details in connection with the valve mechanism.

In carrying our invention into effect in one convenient manner as, for example, in its application to a three-cylinder engine of the rotary type we group the cylinders $a$ with their pistons $b$ and piston rods $c$ around a common crank shaft $d$ in the usual manner, the cylinders being conveniently mounted upon a circular or spherical crank case or chamber $e$ by means of suitably shaped pads or flanges $f$ adapted to be bolted or otherwise secured to the casing, the flanges being preferably arranged about half-way along the cylinders $a$ so that the length of those portions of the cylinders which are arranged upon the outside of the casing may be reduced as much as possible.

We prefer to employ a spherical or substantially spherical crank casing for the reason that a larger reservoir for lubrication is thereby provided while when the engine is intended for use upon an aeroplane or moving vehicle the wind resistance of the structure is less than would be the case were a cylindrical crank case employed. The cylinders may be provided with the usual radiating ribs $g$ and the exhaust and induction valves $h\ i$ are conveniently arranged at the outer end of each cylinder in such a manner that the induction valve $i$ is supported by a spindle $k$ located within a sleeve or collar $l$ formed in one with or supporting the exhaust valve, the concentric valve being arranged to be operated by independent pivoted members $m\ n$. The member $m$ engaging the induction valve is preferably weighted with a small balance weight suitably adjusted so that the suction of the engine may readily open the induction valve when required, the valve being normally retained upon its seat by the centrifugal action due to the rotation of the cylinders. The outer end of each cylinder is provided with a substantially spherical or dome-shaped cover or casing $o$ adapted to protect the valve arrangements that are employed and jointed in any suitable manner to a flange or plate $p$ such that the exhaust and induction passages are separate and distinct, and, if desired, the dome may be extended so that the products of combustion escape from the end of the cylinder past the edges of the dome-shaped cover which consequently act as a silencer.

For the purpose of providing for the efficient cooling of the cylinder head the dome-shaped cover may be arranged at a slight distance from the head so that the rotation of the cylinders causes the air to flow past and around the exhaust valve thereby keeping the valve arrangements in a perfectly cool condition. The crank casing is provided with two side members $q$ which may be flanged or otherwise suitably formed having suitable tubular bosses $r$ formed integral therewith or rigidly secured thereto and upon one of said bosses, we arrange a suitable mitered or beveled wheel $s$ adapted to gear through the intervention of an intermediate bevel wheel or wheels $t$ with a similar bevel wheel $u$ mounted upon the engine shaft $d$, the arrangement forming an equalizing gear between the rotating cylinders and the crank shaft. The gearing is conveniently inclosed by means of a casing $v$ formed from aluminium or other suitable metal, the casing being preferably formed with a chamber $w$ communicating both with the carbureter and with the engine induction pipe $x$, the latter being led to the dome $o$ or being formed integral therewith and provided with an enlarged portion where it joins the dome so that it forms at the same time a cover for the pivoted members in connection with the exhaust and induction valves.

The valve mechanism may be operated in any suitable manner but we prefer to provide for each cylinder a concentric arrangement comprising a tube $z$ within which is a rod or spindle 1 the tube and spindle being preferably formed as shown in Fig. 4 whereby they may be separately operated by means of suitable cams 2 mounted upon a stationary or fixed sleeve 3 surrounding the engine shaft, the cams being stationary while the cam levers 4 are carried by the rotating crank case while the cams and levers are arranged in proper relative positions to one another to secure the requisite timing of the valves for each of the cylinders. In addition to the stationary sleeve 3 there is a second fixed sleeve 5 surrounding the crank shaft. The engine is conveniently mounted by suitable brackets, arms, or the like upon the two fixed sleeves referred to.

For the purpose of securing adequate and efficient lubrication of the moving parts of the engine, oil is forced through an oil inlet in the cross-member 11 along a slot or groove provided in the sleeve until it reaches a recess midway in the bearing surface of the sleeve. The crankshaft within the recess of the sleeve having a sufficient number of holes to convey the oil to its hollow interior, the oil flows along the hollow crankshaft, up the web to the crankpin which is perforated in several places. The oil thus lubricating the crankpin and connecting-rod bearings, the surplus finds its way to the cylinders and eventually into the crankcase. The oil within the crankcase is directed by centrifugal action toward the periphery of the casing whence it is guided in the requisite direction by means of a pipe or pipes 7 whose open ends are set facing opposite the direction of rotation of the crankcase so as to catch up the surplus oil in the case and force it back into the engine bearings, the pipe or pipes being held stationary in any suitable manner as, for example, by being mounted upon the stationary sleeve 5 above referred to. The oil entering pipe 7 as described is forced by gravity down the pipe and along an ample groove provided in the sleeve to the exterior through an outlet nipple attached to the lug which carries this end of the engine by the sleeve. The oil returns to its reservoir and is repumped to inlet 11. By this means the engine is most efficiently lubricated, providing means of circulating sufficient oil to oil-cool the interior of the engine. The hot oil after exit may be circulated about the carbureter, thus assisting carburation and cooling the oil.

Between the gear case $v$ and the crank case $d$ we arrange any suitable type of joint which will permit of free movement of the engine casing without allowing the escape of air therefrom, a convenient joint being formed as shown in Fig. 2 from three or more thin flexible plates 8 flanged at their upper and lower ends and backed by any suitable backing which will give a good wearing face.

The sparking plug 9 may be arranged in any suitable manner but we prefer to mount the same within a casing or the like 10 secured in any suitable manner to the upper end of each cylinder.

It will be evident that a rotary internal combustion engine according to our invention has a wide field of utility and is particularly suitable for use with aeroplanes, motor vehicles, motor-boats, sheep-shearing and other like agricultural implements, drills, machine and hand tools and small electric generators, it being also evident that we may take the power either from the rotating cylinders or from the crank shaft or from both as desired.

Having now described our invention, what we claim as new and desire to secure by Letters Patent is:—

1. An internal combustion engine comprising a plurality of cylinders adapted to rotate about a crank shaft with concentrically arranged inlet and exhaust valves in the head of each cylinder, dome shaped covers acting as fuel passages and adapted to protect said valves, means arranged at a slight distance from the cylinder heads for separating the inlet and exhaust passages, tubes and rods for each set of valves, two stationary cams adapted to actuate said tubes and rods and means for imparting the movement of the tubes and rods to the valves.

2. In an internal combustion engine comprising a plurality of cylinders adapted to rotate about a crank shaft, with concentrically arranged inlet and exhaust valves in the head of each cylinder, flange members arranged at a slight distance from the cylinder heads, and supporting said valves, hollow tubes projecting through said flange members, rods within said tubes, two stationary cams adapted to actuate said tubes and rods, pivoted levers transmitting the movement of the tubes and rods to the valve and dome shaped covers jointed to said flange members and inclosing said pivoted levers.

3. In an internal combustion engine, in combination, a crank case, a plurality of cylinders extending radially therefrom, inlet and exhaust valves concentrically arranged in the head of each cylinder, a dome shaped cover, a flange member between said cover and cylinder head, means for operating said valves comprising tubes and rods, two stationary members adapted to surround the engine crank shaft and to support the engine, two cams mounted on one of said stationary members and adapted to actuate the valve operating means.

In testimony whereof we have signed our names to this specification in the presence of two subscribing witnesses.

ALFRED LEASON REDRUP.
HENRY KIRK BOYLE.

Witnesses:
DORA H. GIBSON,
CHARLES E. TAYLOR.